United States Patent
Playe

(10) Patent No.: US 6,745,304 B2
(45) Date of Patent: Jun. 1, 2004

(54) METHOD AND DEVICE FOR STORING COMPUTER DATA WITH BACK-UP OPERATIONS

(75) Inventor: Patrice Roger Playe, Houilles (FR)

(73) Assignee: Alcatel, Paris (FR)

( * ) Notice: Subject to any disclaimer, the term of this patent is extended or adjusted under 35 U.S.C. 154(b) by 185 days.

(21) Appl. No.: 10/058,010

(22) Filed: Jan. 29, 2002

(65) Prior Publication Data

US 2002/0112135 A1 Aug. 15, 2002

(30) Foreign Application Priority Data

Feb. 15, 2001 (FR) ............................................ 01 02074

(51) Int. Cl.$^7$ ............................................. G06F 12/16
(52) U.S. Cl. ........................ 711/161; 711/162; 714/5; 714/6; 714/7
(58) Field of Search ......................... 711/161, 162; 714/5, 6, 7, 8

(56) References Cited

U.S. PATENT DOCUMENTS

| | | | |
|---|---|---|---|
| 4,758,944 A | * 7/1988 | Bartley et al. | ............... 711/171 |
| 5,584,008 A | 12/1996 | Shimada et al. | |
| 5,966,730 A | * 10/1999 | Zulch | ........................ 711/162 |

FOREIGN PATENT DOCUMENTS

| | | |
|---|---|---|
| EP | 0 172 707 A2 * | 2/1986 |
| EP | 0 410 630 A2 | 1/1991 |
| EP | 0 566 966 A2 | 10/1993 |
| JP | 2000267820 A * | 9/2000 |

OTHER PUBLICATIONS

Suzuki K et al:, "Storage Management Software for Mainframe and UNIX", Fujitsu–Scientific and Technical Journal, Fujitsu Limited. Jun. 1, 1995, pp. 36–44, vol. 31, No. 1Kawasaki, JP.

* cited by examiner

Primary Examiner—B. James Peikari
(74) Attorney, Agent, or Firm—Sughrue Mion, PLLC

(57) ABSTRACT

A method of storing data processed during the operation of a data processing system, stored in the form of files in main storage means of the system and backed up by copying it to auxiliary storage means, includes, at transfer initiation times periodically recurring with a long period, transferring files stored in the main storage means of the system when it is operating from the primary storage area in which they are initially stored in the main storage means to a secondary storage area of the main storage means if they were not created and/or modified during the immediately preceding long period. Thus files recently created or modified can be processed separately from other files, to enable differentiated back-ups.

7 Claims, 1 Drawing Sheet

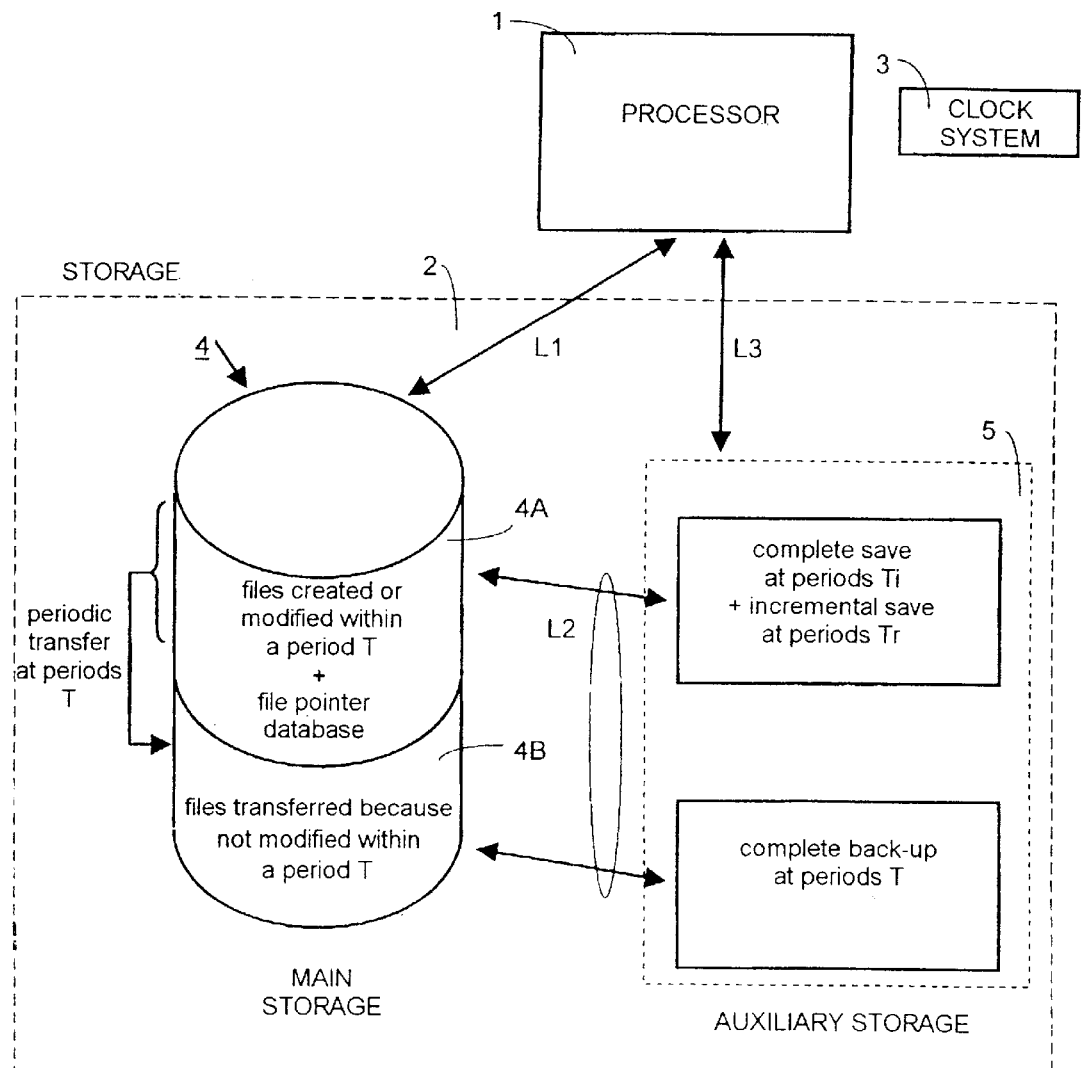

METHOD AND DEVICE FOR STORING COMPUTER DATA WITH BACK-UP OPERATIONS

CROSS-REFERENCE TO RELATED APPLICATIONS

This application is based on French Patent Application No. 01 02 074 filed Feb. 15, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a method of storing data resulting from the operation of a data processing system and stored in storage means of the system, referred to herein as main storage means, and which is copied (to provide a "back-up" for use in an emergency) in storage means, referred to herein as auxiliary storage means, so that the data can be copied back in the event of an incident preventing use of data stored in the main storage means. The invention also relates to a storage device for implementing the method.

2. Description of the Prior Art

Computer data is routinely backed up on a storage medium other than that on which the data is initially stored to limit the inconvenience resulting from loss of data from a data processing system, which can have diverse causes, such as a hardware fault or software error, for example, or an operator error.

One prior art method periodically performs two separate back-ups in a data processing system. A first periodic back-up makes a complete copy onto a particular media module of all of the files containing data resulting from the operation of the data processing system over a period of time that can be considered to constitute a long period, for example one or two weeks. The second periodic back-up makes a selective and incremental copy of files containing data resulting from the operation of the data processing system over a much shorter period of time, for example of the order of one day. Thus an incremental back-up copies only files created or modified since the immediately preceding back-up.

The volume of data to be copied in a complete back-up and the duration of that operation usually prevent repeated back-ups at frequent intervals, in particular if the data processing system includes a large number of interconnected machines.

A drawback of the prior art method described above is that it is not easy to restore lost data from copies made by the periodic back-up operations that it provides if the restore operation must take into account a plurality of copies, for example a series of copies spanning a period of more than a few weeks. The operations to be carried out to restore the data then become very complex, and can therefore entail reading a relatively large number of media modules, and take too long to provide a satisfactory response to the needs of users, on whose behalf the data processing system is operated, since the fastest possible restoration of the data is generally required. The benefit of an incremental back-up is that it makes it possible to supply each user with a copy of the work that they were doing in the state at which that work existed at the time of the back-up, short of always being able to restore the work to the user in the state in which it existed at the time it was unintentionally interrupted. The objective aimed at is to avoid each user having to redo, or have redone, work that has been done and unintentionally interrupted, and delayed restoration of data rapidly becomes of no benefit in the case of work in progress.

SUMMARY OF THE INVENTION

The invention therefore proposes a method of storing data processed during the operation of a data processing system, stored in the form of files in main storage means of the system and backed up by copying it to auxiliary storage means, which method includes, at transfer initiation times periodically recurring with a long period, transferring files stored in the main storage means of the system when it is operating from the primary storage area in which they are initially stored in the main storage means to a secondary storage area of the main storage means if they have not been created and/or modified during the immediately preceding long period, in order to separate files recently created or modified from other files, to enable differentiated back-ups.

According to the invention files stored in the primary storage area are backed up by complete copying to the auxiliary storage means of the system at an intermediate period less than the long period, of which it is preferably a submultiple, and by incremental copying to the auxiliary means at a short period less than the intermediate period, of which it is preferably a submultiple, files stored in the secondary storage area being backed up to the auxiliary storage means with the long period.

According to the invention, files are periodically transferred from the primary storage area to the secondary storage area in the main storage means under the control of the operating system of the data processing system including the main storage means and in a manner that is entirely transparent to a user.

According to the invention, access pointers to files stored in the secondary storage area of the main storage means are stored in a database located in a primary storage area of the main storage means that is updated on transferring files from the primary storage area to the secondary storage area and in the event of requests to modify or eliminate a file stored in the secondary storage area, each request leading to the deletion of the pointer for accessing the file in the secondary storage area after copying the file into the primary storage area in the case of a request for modification.

The invention also proposes a data storage device for a data processing system including storage means for storing data assigned to a data processor entity that includes at least one processor and operates in conjunction with a clock system, the storage means including:

main storage means in which the data is stored in the form of files and with which at least one processor of the processing entity communicates for transmission and command purposes when the data processing system is operating, and auxiliary back-up storage means for storing files periodically copied from the main storage means.

According to the invention, the main storage means are organized into at least two separate storage areas, including a primary area for storing files newly created and/or modified and a secondary area into which are periodically transferred, at a transfer initiating time recurring periodically with a specified long period, files stored in the primary area that have not been created and/or modified during the immediately preceding long period, the areas providing for differentiated back-ups of files recently created or modified and other files, producing copies of different files at different periods.

The invention, its features and its advantages are explained in the following description, which is given with reference to the single FIGURE of the accompanying drawing.

BRIEF DESCRIPTION OF THE DRAWING

The single FIGURE of the accompanying drawing is a block diagram showing the elements of a data processing system implementing a data storage method according to the invention.

DETAILED DESCRIPTION OF THE PREFERRED EMBODIMENT

The method in accordance with the invention described here of storing computer application data is for use in a data processing system including one or more processor machines, which are assumed to be interconnected in the latter case.

Here the data processing system is shown diagrammatically in the form of a system including a processor entity 1 including one or more data processor units each including one or more appropriately programmed processors. An entity 2 combines data storage means for use by the unit or units of the processor entity 1 and a clock system 3 that in particular governs exchange of data between the unit or units of the processor entity 1 and the data storage means in the entity 2.

The elements that can be used in the entities 1, 2 and the clock system 3 are well known to the person skilled in the art and therefore do not need to be described in detail here, as they do not directly constitute the subject matter of the present invention.

In the FIG. 1 block diagram, the storage means of the entity 2 are composed of storage means 4, referred to herein as main storage means, and storage means 5, referred to herein as auxiliary storage means and used for "back-ups".

The main storage means 4 are used by the units of the entity 1 to store data which the units generally process during operation of the system, the term "processing" here encompassing using, converting, creating, etc., for example.

The main storage means 4 correspond to a hard disk or a set of hard disks, for example, communicating with the data processor entity 1 to transfer data over links symbolized by a link L1 in FIG. 1. This is known in the art. Such transfers of data between main storage means 4 and units of the entity 1 are effected, for example, when loading an application program or a file into random access memory of a unit processor from storage means, because the processor requires the program or file for a particular processing operation. This is also known in the art. Data is also transferred in the opposite direction from the data processor entity to the main storage means, for example, for storing a data file during a processing operation effected by a processor on data supplied to it. That data may have been extracted from the main storage means themselves or it may have been supplied via an interface, for example a man-machine interface or a machine—machine interface, following a command initiated by a user or executed in response to a user request. This is also known in the art.

In accordance with the invention, at a periodically recurring time at which such transfer is initiated, data files stored in the main storage means of a system when the system is operating are periodically transferred from the area in which they are initially stored to another storage area, here referred to as a secondary storage area, if they were not created and/or modified during the immediately preceding transfer period T.

The period T is chosen to be long, for example of the order of six months or a year. The files concerned are transferred from the storage area 4A, here referred to as the primary storage area, in which they were previously held, into a secondary storage area 4B provided for them in the main storage means. The operations relating to this file transfer from the primary storage area to the secondary storage area within the main storage means are preferably carried out under the control of the operating system of the data processing system, which provides all the necessary commands. These operations can therefore be totally transparent to the user of the system.

Access to the files stored in the main storage means is conventionally obtained by means of pointers established at the level of the processor entity 1 for each of the files stored. The pointers are grouped in a database localized to the area 4A of the main storage means and are created using programs known to the person skilled in the art. In a preferred embodiment in which file transfers from the primary storage area to the secondary storage area within the main storage means are carried out under the control of the operating system of the data processing system, the file pointer database is then common to the two storage areas 4A and 4B. It is also possible to envisage providing a different file pointer database for each of the two storage areas 4A, 4B and to locate the two databases in the storage area 4A, in particular if the file transfers from the primary area 4A to the secondary area 4B are carried out under the control of a system other than the operating system of the data processing system.

In the proposed preferred embodiment, the pointer database is updated as and when new files are stored in the primary storage area 4A and as and when files stored therein are modified. The pointers in the database are updated when transferring files that have not been modified in a time period greater than T from the primary area 4A to the secondary area 4B, so that the processor entity 1 can continue to access the files after they have been transferred to the secondary storage area.

If a file in the secondary area 4B must be modified, it is copied into the primary area 4A. The pointer enabling it to be reached in the secondary area 4B is deleted from the pointer database, the file copy made in the primary area 4A is modified as necessary, and the pointer for reaching it in the area 4A is held in memory in the file pointer database. A request to eliminate a file stored in the secondary area 4B deletes the pointer that enabled it to be reached and was held until then in the file pointer database.

The auxiliary storage means 5 for back-ups are organized to cooperate with the main storage means 4 under specified conditions. They ordinarily use a write/read device employing removable and interchangeable modular storage media, such as magnetic tapes or disks.

As indicated above, the transfers of data between the main and auxiliary storage means are assumed to be governed by at least one unit of the processor entity 1, in conjunction with the clock system 3, or possibly through co-operation of a plurality of units of said processor entity in conjunction with the clock system. To this end, there is communication between the main storage means 4, the auxiliary storage means 5 and the processor entity responsible for governing them, using a set of transmission means symbolized by the transmission links L1, L2, L3 in FIG. 1. The links L1, L2, L3, the main storage means 4 and the auxiliary means 5 are not described in detail here because their respective natures are only indirectly related to the subject matter of the present invention.

The method in accordance with the invention of storing computer data is more particularly intended to be applied to data created and/or modified in a data processing system while it is operating. Such data may be irretrievably lost in the event of an incident before it has been backed up in a manner such that it can be retrieved with certainty. Such computer data includes application data that the data processing system produces or modifies in the context of application processing that it executes, and indexing data, in particular pointers. This is known in the art. Pointers are created in particular to track and therefore retrieve stored data that was created or modified while the system was in operation.

The storage method according to the invention provides various periodic back-up operations relating to files held in the main storage means.

A first complete back-up is performed periodically for files in the secondary area 4B of the main storage means. It is preferably effected after a periodic transfer of unmodified files from the initial primary storage area to the secondary storage area. It copies to the auxiliary storage means 5 the content of the secondary storage area 4B, such as it existed at the time of the back-up. The content is assumed to be copied onto a storage medium 6 in the auxiliary means 4, which medium is ordinarily removable and modular, as already indicated. The period of this first complete backup corresponds to the long transfer period T defined above, for example, a first complete back-up then being carried out after each transfer between areas 4A and 4B of the main storage means.

A second complete back-up is periodically carried out on the content of the primary storage area 4A of the main storage means 4. It is repeated with a period, referred to herein as the intermediate period Ti, which is significantly less than the period T, of which Ti is a submultiple, for example. The intermediate period is of the order of a fortnight, for example, if the period T is six months. The back-up copies to the auxiliary storage means 5 the content of the primary storage area 4A, such as it existed at the time of the back-up. It uses a storage medium 7, for example, which can be of the same type as the storage medium 6.

Using two separate complete back-ups for, on the one hand, files that have not been modified for a relatively long time and, on the other hand, and with a shorter period, files modified more recently, limits the volume of the data transfers between the main and auxiliary storage means. The duration of such transfers is also reduced, by eliminating repetitive and superfluous transfers of files that have not been modified. This also reduces storage media requirements.

An incremental back-up is periodically carried out in the primary storage area 4A of the main storage means. It is repeated with a short period Tr that is preferably very much less than an intermediate period, of which it is a submultiple, for example, the short period Tr being one day, for example, if the intermediate period Ti is of the order of a fortnight. The incremental back-up copies into the auxiliary means 5 files stored in the primary storage area 4A created or modified since the last back-up. All the files concerned are stored in the auxiliary storage means, for example, on a storage medium 7.

Associating complete back-ups and incremental back-ups from the primary storage area of the main storage means also limits the volume of data transfers between the main and auxiliary storage means and the duration of those transfers, for the same reasons as before. It therefore greatly reduces the requirements in terms of the storage media 7.

The choice of a short period Tr for initiating incremental back-ups, on the one hand, limits the volumes of data to be transferred and the times needed to carry out incremental back-ups and, on the other hand, reduces the volume of data lost because of an incident occurring during the transfer phase.

Back-ups to the auxiliary storage means 5 enable the most exact possible restoration of the content of the main storage means 4 if required, i.e. usually after an error or an incident.

This implies that the pointer database stored in the primary storage area 4A of the main storage means can be used; if the database cannot be used, it is necessary to use data that has been backed up by sending it to the auxiliary storage means.

Here it is assumed that the primary area 4A pointer database is restored by copying it from the last back-up to a storage medium 7, which can be either an incremental back-up or a complete back-up, ordinarily of period Tr.

Using the back-ups can be made necessary by an attempt to recover one or more files no longer stored in the main storage means, where they should be located. The backed up pointer database is then used to obtain the location of each of the files in the auxiliary storage means, in order to copy them from the storage medium 6 or 7 onto which they were backed up into the primary storage area 4A or the secondary storage area 4B, where they should have been located.

It may be necessary to restore as faithfully as possible all files previously localized in the main storage means after an incident implying such a restore. A conventional series of copies from the auxiliary storage means to the main storage means is then performed. It includes copying the last complete back-up of the content of the secondary storage area 4B to a storage medium 6 made before the incident. It is completed by copying the last complete back-up of the content of the primary storage area 4A to a storage medium 7 made before the incident referred to above, and copying any incremental back-ups done after the last complete backup of the area 4A.

Restoring data to the main storage means from files backed up in the auxiliary storage means using the most recent database of file pointers backed up in the auxiliary storage means enables all files that were accessible via the pointers in that file pointer database to be restored identically and made available again.

There is claimed:

1. A method of storing data processed during the operation of a data processing system, said data being stored in the form of files in a main storage means of said system and backed up by copying said data to an auxiliary storage means, said method comprising, at transfer initiation times periodically recurring over a long period, transferring files, stored in said main storage means when operating from a primary storage area thereof in which the files are initially stored in said main storage means, to a secondary storage area of said main storage means if the files were not created and/or modified during an immediately preceding said long period, in order to separate recently created or modified files from other files, to enable differentiated back-up operations.

2. The storage method claimed in claim 1, wherein said files stored in said primary storage area are backed up by complete copying to said auxiliary storage means of said system over an intermediate period Ti less than the long period T, and by incremental copying to said auxiliary means over a short period Tr less than the intermediate period, files stored in said secondary storage area being backed up to said auxiliary storage means over said long period T.

3. The storage method claimed in claim 2, further comprising periodically transferring files from said primary storage area to said secondary storage area in said main storage means under control of an operating system, of said data processing system, including said main storage means and in a manner that is entirely transparent for a user.

4. The storage method claimed in claim 2, wherein each of said intermediate period and said short period is a submultiple of said long period.

5. The storage method claimed in claim 1, further comprising periodically transferring files from said primary storage area to said secondary storage area in said main storage means under control of an operating system, of said data processing system, including said main storage means and in a manner that is entirely transparent to a user.

6. The storage method claimed in claim 1, further comprising storing access pointers, to files stored in said secondary storage area of said main storage means, in a database located in said primary storage area of said main storage means that is updated on transferring files from said primary storage area to said secondary storage area and in the event of requests to modify or eliminate a file stored in said secondary storage area, each request leading to the deletion of the pointer for accessing said file in said secondary storage area after copying said file into said primary storage area in the case of a request for modification.

7. A data storage device for a data processing system including storage means for storing data assigned to a data processor entity that includes at least one processor and operates in conjunction with a clock system, said storage means including:

main storage means in which said data is stored in the form of files and with which at least one processor of said processing entity communicates for transmission and command purposes when said data processing system is operating, and auxiliary back-up storage means for storing files periodically copied from said main storage means, in which device said main storage means is organized into at least two separate storage areas, including a primary area, for storing files newly created and/or modified, and a secondary area into which are periodically transferred, at a transfer initiating time recurring periodically over a specified long period, files stored in said primary area that have not been created and/or modified during the immediately preceding long period, said primary and secondary areas providing for differentiated back-ups of files recently created or modified and other files, and thereby producing copies of different files at different periods.

* * * * *